Patented Sept. 13, 1938

2,129,690

UNITED STATES PATENT OFFICE 2,129,690 n-PROPYLMETHACRYLATE

Rowland Hill, Blackley, Manchester, England, assignor to Imperial Chemical Industries Limited, a corporation of Great Britain No Drawing. Application December 3, 1935, Serial No. 52,665

7 Claims. (Cl. 260—2)

The present invention relates to a new material, to methods for its preparation, and more particularly to n-propyl-methacrylate and a process for its preparation.

An object of the present invention is to provide a new composition of matter and a process for its preparation. A further object of the invention is to provide a new polymerizable composition of matter together with a process for its polymerization. A still further object of the invention is to provide a process for the preparation of a methacrylic acid ester of n-propyl alcohol, which may be obtained by the ester interchange method of interacting the methyl ester of methacrylic acid with n-propanol. Another object is to provide a methacrylic acid ester of n-propanol. Another object of the invention is to provide mixtures or interpolymers of n-propylmethacrylate with other polymerizable compounds, particularly with those of methacrylic and acrylic acids. Other objects and advantages of the invention will hereinafter appear.

There has been prepared in accord with this invention a valuable ester of methacrylic acid which has been found useful as prepared and even more valuable when polymerized. This compound is n-propylmethacrylate.

The following specific example is furnished to illustrate a method of preparing the new composition of matter, but it will be understood that the invention is not limited to the details therein given.

Example 1.—480 parts of n-propyl alcohol were mixed with 3200 parts of methyl methacrylate, 18.4 parts of concentrated sulfuric acid and 192 parts of hydroquinone (all parts are given by weight) and the resulting mixture heated on the water bath until solution was complete. The solution was then heated on an oil bath, held for approximately 10½ hours at a temperature of approximately 150° C. under a 48" fractionating column fitted with a condenser arranged for controlling reflux. Distillate was collected at such a rate that the temperature at the head of the column remained at the boiling point of the methanol-methyl methacrylate binary (64°). The cold reaction mixture was neutralized and then washed and dried over a suitable desiccating medium, such as calcium chloride. The solvents were removed from the dried product by fractional distillation, and the ester finally separated by fractionation under reduced pressure. A 62% yield of n-propyl-methacrylate was obtained. It has a boiling point of 71–75° C. at 88 mm., a saponification number of 449.8, (theoretical 438) and a density at 20° C. of 0.906.

Other methods may, of course, be employed for the preparation of n-propylmethacrylate such, for example, as are disclosed in the copending applications Daniel E. Strain and/or Harold J. Barrett Ser. Nos. 735,274-5-6-7-8-9 filed July 14, 1934, or by any of the well known suitable esterification or ester interchange processes.

n-Propylmethacrylate is a mobile liquid as produced, is monomeric, and may be polymerized, according to the invention, by means of heat, light, and/or a catalyst, e. g., as described for the polymerization of organic vinyl esters in Br. specification 15271/1914. Preferably a catalyst such as oxygen, ozone, an organic peroxide, an ozonide, etc. is employed. Other catalysts which may be used include aluminum sulfate, boron fluoride, the mineral acids, e. g., hydrochloric and sulfuric acids, as well as the organic acids and more particularly acetic and methacrylic acids, etc., as well as the anhydrides and acid halides of such organic acids; metal salts of fatty acids and resinic acids, e. g., cobalt linoleate and resinate, manganese oleate and resinate, etc. The polymerization may be effected in the presence or absence of a solvent for both monomer and polymer, or in the presence of a solvent for the monomer and a non-solvent for the polymer, or the monomer may be emulsified and then polymerized. Preferably polymerization is carried out at a moderate temperature, i. e., between 60–100° C., altho higher temperatures may be employed. The polymerization reaction is strongly exothermic and it may be necessary to control the temperature by cooling devices; the polymerization may be carried out in apparatus which may or may not be provided with condensing devices, or in suitable pressure equipment.

As indicated, various polymerization methods may be employed and it has been found that the properties of the polymers, the physical properties to a large extent and the chemical properties to a lesser extent, are altered considerably by the type of polymerizing process utilized. The process described in the copending applications of Daniel E. Strain Ser. Nos. 668,080, filed April 26, 1933, and 704,753, December 30, 1933, may be used, if desired.

Methods illustrating the polymerization of the monomeric ester will now be described, but it will be understood that other suitable polymerizing processes may be employed.

Example 2.—50 parts (parts are given by volume) of n-propylmethacrylate monomer were dissolved in 200 parts of methanol in a bottle provided with a stopper, then 0.5 part of powdered benzoyl peroxide was added to this solution. After the benzoyl peroxide had all dissolved, 95 parts of water (an amount insufficient to cause permanent turbidity) were added. The bottle was securely closed and placed in an oven at approximately 65° C. After the polymerization was complete in approximately 4 days, the mixture was allowed to cool. The liquid was decanted from the polymer which had settled to the bottom. The polymer was obtained in an 86% yield as a white solid, soluble in butyl acetate, acetone, and toluene.

The compatibility was determined by dissolving 40 grams of a 50% toluene solution of the polymerized ester in a solution consisting of 20 parts of nitrocellulose and 380 parts of butyl acetate. The resulting solution, when spread on a glass plate and allowed to dry at room temperature, gave a clear transparent film.

The n-propylmethacrylate polymer was placed in a disk shaped mold in which it was subjected to a temperature of 125° C., and a pressure of approximately 4,000 pounds per square inch for approximately 15 minutes. A clear slightly brittle molded disk was obtained which softened at a temperature of 45° C.

*Example 3.*—500 parts of n-propylmethacrylate monomer and 10 parts of benzoyl peroxide were dissolved in 2,000 parts of toluene. The resulting mixture was heated to a temperature of approximately 100° C. on a steam bath for 6 hours whereupon a clear, slightly yellow solution was obtained. The resin solution was concentrated to 1250 parts which contained 38.7% resin, thus giving a 94.7% yield. The resin is soluble in toluene and acetone, and has a viscosity of 0.03 poise (15% solution in toluene at 25° C.).

Valuable products may be obtained by utilizing the polymer together with other polymeric compounds, particularly polymeric acrylic and methacrylic acid esters. Especially valuable products result if the monomeric esters are mixed prior to their polymerization; by this method interpolymers having a wide range of characteristics are possible. Due to the unique characteristics of methyl methacrylate polymer, which is a hard resin having a high melting point, its admixture with the polymeric n-propylmethacrylate or interpolymers thereof are particularly well adapted for many uses.

The polymeric n-propyl ester of methacrylic acid is particularly well suited for thermoplastic molding as well as are many of its mixtures and interpolymers with other acrylic and methacrylic acid resins. The ester may be polymerized and/or preformed prior to placing in the mold and then may be molded in accord with the usual procedural steps employed particularly in the molding of methyl methacrylate as described in the Rowland Hill U. S. Patent No. 1,980,483. The mold preferably is hot, prior to the introduction of the polymerization product, is then closed and the material so confined heated and pressed, the temperatures ranging from approximately 80–150° C., and pressures from 200 pounds per square inch, upward, are usually sufficient to give a suitably molded product. The presence or absence of plasticizers will, of course, alter considerably the molding conditions, and it is usually advantageous to have present plasticizers to alter the physical characteristics of the resulting product to fit the particular need for which the molded article is to be used.

The masses resulting from polymerization can immediately (i. e., in the state they have been obtained) be made into useful articles. It is possible to obtain the required articles if, for instance, the polymerization be carried out while the initial material is in a suitable mold, for instance, one of steel or suitable metal, so that the articles, for example, umbrella handles, fountain pen barrels, buttons, and the like, are obtained directly from the mold. Or, if desired, the masses may be worked to the required shape by softening with suitable softeners or plasticizers in the presence of volatile solvents and, after shaping, evaporating the solvent.

The polymerization products may be worked into the required shapes in various ways, for example, they can be softened and kneaded, rolled, compressed, drawn into wires, threads or the like, or the masses can be mixed with additional substance, and rolled into plates, or films, or they may be pressed into the required shapes such as buttons, combs, and the like.

The solid masses can be worked by cutting, sawing, filing, or the like, whether they be obtained directly by polymerization, or after special treatment of the polymerized masses. These shaped articles may be polished, and parts connected together by smearing the faces to be connected with a suitable solvent, such as acetone, butyl acetate, or the corresponding methacrylic acid ester.

The polymerization product dissolved in a suitable solvent which may or may not be the monomer may be transformed into a useful article, e. g., films and fibers, by casting and then evaporating the solvent, or by extruding thru a suitable orifice into a precipitating bath or drying atmosphere. The polymer may be recovered from such solutions by precipitation with a suitable non-solvent for the polymer.

The properties of the resulting masses may be widely varied by modification with plasticizers, e. g., dibutyl phthalate, tricresyl phosphate, etc., drying, seim-drying and non-drying oils, synthetic and natural resins, waxes, bitumens, cellulose derivatives, e. g., cellulose nitrate and ethyl cellulose, etc., pigments, fillers, and dyes, etc. Thus, it is possible to produce instead of hard glass-like masses, also soft and flexible masses; likewise, by the addition of suitable coloring means, it is possible to produce masses, or objects, having any desired color effects. The incorporation of the additions can be effected either before, or during, the polymerizing process, or the additions can be made to the already formed polymerization products in a suitable condition.

Coating compositions of special merit can be obtained from combinations of propyl methacrylate and alkyd resins and especially drying, semi-drying and non-drying oil modified alkyd resins, with which propyl methacrylate shows a surprising degree of compatibility as compared to its nearest homologs, ethyl methacrylate and butyl methacrylate. Propylmethacrylate polymer is compatible with a 50% soya bean oil modified alkyd resin in quantities up to 30–35%, that is, clearer homogeneous films are deposited when solutions of two resins are flowed, brushed, or sprayed into films and allowed to dry. Useful compositions can be obtained using even higher ratios of normal propylmethacrylate, especially in the production of pigmented and opaque films. The drying time of alkyd resins is reduced and the hardness of films produced therefrom is increased by admixture with propylmethacrylate polymer. Pigmented alkyd resin compositions are rendered more stable against discoloration by the addition of propylmethacrylate polymer. Propylmethacrylate alkyd resin compositions are suitable for the production of coating compositions for both indoor and outdoor exposures over rigid and flexible surfaces. Among particularly advantageous uses may be mentioned porcelain-like finishes for table tops, refrigerators and the like. Because of its freedom from taste propylmethacrylate, alone or in combination with alkyd resins, is suitable for coating the inner surfaces of food and beverage containers. Non-chalking nitrocellulose lacquers can be obtained by the use of propylmethacrylate polymer along with nitrocellulose, pigments, plasticizers, and solvents. Clear durable varnishes can be obtained from combinations of China-wood oil, propylmethacrylate and oil-soluble phenolaldehyde resin used, for example, in the ratio (by weight) 20:20:1 along with a small amount of a metal drier. In the preparation of compositions wherein propylmethacrylate is used in connection with alkyd resins, drying oils, or cellulose derivatives the propylmethacrylate may be used in the monomeric, partially polymerized, or polymerized form or in admixture with other polymerizable compounds in the form of monomers, partially polymerized mixtures, or as interpolymers.

If the polymerization of the n-propylmethacrylate be carried out in an incomplete manner, a syrupy solution of the polymerization product containing some unchanged monomer is obtained. This syrupy product can be utilized either directly, or along with other solvents, or diluents, for the production of substances to be used for coating, painting, or impregnating purposes. If, for instance, a porous substance such as wood, paper, textile fabric, artificial stone, or the like be coated with the said syrupy solution or be impregnated therewith, coatings and impregnations very resistant to wear are obtained on completing the polymerization of the coating, painting, or impregnation, for instance by exposing the article to artificial or natural light, or by heating it, or by employing both light and heat. In this case a portion of the unchanged esters in the syrupy solution may or may not be evaporated while another portion may be converted into the solid polymerization product. The articles thus treated have imparted to them a very high resistance to external influences, e. g., resistance to water, acids, alkalis, and atmospheric changes.

The said syrupy mass can be mixed with comminuted matter, such, for instance, as ground cork, of ground wood, fibrous substances, mineral fillers, or the like, and the mixture be made into the proper shape and while monomer present in the articles may be converted by suitable polymerization into the solid final product.

It is also possible to start from solid, semi-solid, or plastic polymerization products of the n-propylmethacrylate, these being softened by heating them by themselves, or with suitable solvents, and using them in their softened state. On cooling, or on the evaporation of the diluent, that may still be present, the products are converted into the solid form. A lacquer film may be prepared in this way.

Polymeric n-propylmethacrylate as well as mixtures and intepolymers with various polymerized acrylic and methacrylic acid esters can be used in suitable compositions for lacquering, painting, or impregnating. The wholly or partly polymerized n-propyl ester, mixture of interpolymer containing it can be mixed with suitable additional substances to modify the properties of the lacquering, painting, or impregnating materials in any desired manner. As additions of this kind there may be mentioned oils (such, for instance, as castor oil), dyes, powdered substances (such as zinc oxide), camphor, and other plasticizers, and the like.

In accordance with this invention it is possible to obtain valuable products if the said polymers be dissolved, or softened in suitable solvents and then be converted again to the solid state. The products thus obtained may be used for purposes for which cellulose esters have hitherto been used, namely as substitutes for horn, amber, artificial resins, lacquers, for impregnation purposes, and also for the production of films, interlayers for safety glass, pressure adhesives, artificial threads, and the like.

The products thus formed have the advantage over products made from nitrocellulose in being slower burning and odorless. By the addition of suitable agents, the strength and hardness of the products may be modified within wide limits so that it is possible to manufacture both hard, horn-like substances and soft and more pliable products. The products may also be modified by varying the conditions of the polymerization.

The monomer may be polymerized in the presence of a solvent and the solution used as such or the polymer recovered from the solution by evaporation or precipitation methods. In many cases, however, it is more profitable to use an amount of solvent insufficient to produce a freely flowing solution, so that soft plastic masses are obtained which can be pressed, kneaded, rolled, or drawn into shape, or formed into blocks, plates, or films.

Plasticizers or other modifying agents may be added to the monomer prior to polymerization or directly to the polymerized product, it being generally desirable to employ a plasticizer which is soluble in the polymer and the monomer, altho it is not essential that the dual solubility characteristics be present. Thus, plasticizers or softening agents, such as, for example, camphor; phthalates, such as ethyl, propyl, isopropyl, butyl, isobutyl, cyclohexyl, methyl cyclohexyl, or benzyl phthalate or phthalates of the mixed type, such as cyclohexyl butyl, benzyl butyl or butyl lauryl phthalate; esters of other dibasic acids, such as the ethyl, propyl, isopropyl, butyl, isobutyl, cyclohexyl methyl cyclohexyl or benzyl esters of succinic, fumaric, tartaric, adipic and sebacic acids; esters of monobasic acids, such as the butyl, isobutyl, cyclohexyl, methyl cyclohexyl, benzyl or lauryl esters of lauric, laevulinic, benzoic, benzoyl propionic and benzoyl benzoic acids; esters of polyhydric alcohols, e. g., glycol and glycerol, such as glycol benzoate, glycol laevulinate, triacetin, tripropionin and tributyrin; the ether alcohol esters of the polycarboxylic acids, e. g., methoxy ethyl and ethoxy ethyl phthalate; substituted toluene sulphonamides, such as ethyl paratoluene sulphonamide; substituted amides, such as tetraethyl phthalamide, tetrabutyl succinamide, tetrabutyl adipamide, tetraethyl phthalamide; hydrocarbons, such as dixylyl ethane; halogenated hydrocarbons, such as chlorinated diphenyls and dichlordibenzyl; ether compounds such as dicresoxy ethyl ether; and drying, non-drying or semi-drying oils, such as castor oil, cotton seed oil, linseed oil, and the like. These additions also facilitate later mechanical treatment, as cutting, sawing, and polishing.

The polymerized n-propylmethacrylate ester, mixtures of the polymerized ester with other polymerizable compounds such as polymerizable compounds of methacrylic or acrylic acids, or vinyl compounds; or interpolymers of the esters with such other compounds, may be used advantageously as safety glass interlayers. These polymerized esters, mixtures thereof, or interpolymers thereof may be plasticized or otherwise modified as desired. The compositions in an unpolymerized, partially polymerized, or completely polymerized condition may be used in laminated glass. If the composition is in the unpolymerized or partially polymerized state, polymerization may be effected by subjecting the composite to light and/or heat.

From a consideration of the above specification it will be realized that various changes may be made in the process or product without departing from the invention or sacrificing any of its advantages.

I claim:
1. n-Propylmethacrylate.
2. A new composition of matter comprising n-propylmethacrylate having a boiling point of approximately 71–75° C., at a pressure of 88 mm.
3. Polymeric n-propylmethacrylate.
4. A molding composition comprising polymeric n-propylmethacrylate.
5. A lacquer composition comprising polymeric n-propylmethacrylate.
6. A molded article containing polymeric n-propylmethacrylate.
7. An interpolymer of n-propylmethacrylate and a polymerizable compound of the group consisting of vinyl compounds and esters and other compounds of methacrylic and acrylic acids.

ROWLAND HILL.